United States Patent
Han et al.

(10) Patent No.: US 11,085,384 B2
(45) Date of Patent: Aug. 10, 2021

(54) METHOD AND APPARATUS FOR PROTECTING CLUTCH IN VEHICLE DRIVING PROCESS

(71) Applicant: Guangzhou Automobile Group Co., Ltd., Guangdong (CN)

(72) Inventors: Lingtao Han, Guangdong (CN); Chao Ding, Guangdong (CN)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 39 days.

(21) Appl. No.: 16/301,450

(22) PCT Filed: Apr. 26, 2018

(86) PCT No.: PCT/CN2018/084689
§ 371 (c)(1),
(2) Date: Nov. 14, 2018

(87) PCT Pub. No.: WO2018/196825
PCT Pub. Date: Nov. 1, 2018

(65) Prior Publication Data
US 2020/0040831 A1  Feb. 6, 2020

(30) Foreign Application Priority Data
Apr. 27, 2017 (CN) .......................... 201710287960.4

(51) Int. Cl.
*F02D 41/02* (2006.01)
*F16D 48/10* (2006.01)
(Continued)

(52) U.S. Cl.
CPC .......... *F02D 41/022* (2013.01); *B60K 17/02* (2013.01); *B60K 17/34* (2013.01); *B60K 23/08* (2013.01);
(Continued)

(58) Field of Classification Search
CPC .......... F02D 41/022; F02D 2200/1002; F02D 2200/50; F02D 2250/26; B60K 17/02;
(Continued)

(56) References Cited

U.S. PATENT DOCUMENTS 3,899,877 A  8/1975  Flanigan et al.
5,723,779 A  3/1998  Hara et al.
(Continued)

FOREIGN PATENT DOCUMENTS

CN  1112080 A  11/1995
CN  1149107 A  5/1997
(Continued)

*Primary Examiner* — Peter D Nolan
*Assistant Examiner* — Demetra R Smith-Stewart
(74) *Attorney, Agent, or Firm* — Gang Yu

(57) ABSTRACT

Related are a method and an apparatus for protecting a clutch in a vehicle driving process. The method comprises: acquiring a current oil temperature of a space where the clutch is located and judging whether the current oil temperature is within a set temperature interval or not; in a case where the current oil temperature is within the set temperature interval, detecting whether a current wheel speed difference between front shaft and rear shaft reaches to a set wheel speed difference threshold or not; and in a case where the current wheel speed difference between the front shaft and rear shaft reaches to the set wheel speed difference threshold, triggering a first protective mode that is preset to protect the clutch; and in a case where the current oil temperature is higher than the set temperature interval, triggering a second protective mode that is preset to protect the clutch.

8 Claims, 3 Drawing Sheets

(51) Int. Cl.
  *B60K 17/02* (2006.01)
  *B60K 17/34* (2006.01)
  *B60K 23/08* (2006.01)

(52) U.S. Cl.
  CPC ...... *F16D 48/10* (2013.01); *F02D 2200/1002* (2013.01); *F02D 2200/50* (2013.01); *F02D 2250/26* (2013.01); *F16D 2500/106* (2013.01); *F16D 2500/3065* (2013.01); *F16D 2500/30404* (2013.01); *F16D 2500/3115* (2013.01); *F16D 2500/50296* (2013.01)

(58) Field of Classification Search
  CPC ... B60K 17/34; B60K 23/08; F16D 2500/106; F16D 2500/30404; F16D 2500/3065; F16D 2500/3115; F16D 2500/50296
  See application file for complete search history.

(56) References Cited

U.S. PATENT DOCUMENTS

| | | | |
|---|---|---|---|
| 2003/0079954 A1 | 5/2003 | Murakami et al. | |
| 2003/0134712 A1* | 7/2003 | Katou | F16H 61/061 477/70 |
| 2004/0147366 A1* | 7/2004 | Aoki | B60K 28/165 477/6 |
| 2010/0252348 A1* | 10/2010 | Ueda | B60K 23/04 180/244 |
| 2016/0207523 A1* | 7/2016 | Kotsuji | B60W 20/00 |
| 2016/0208910 A1* | 7/2016 | Kotsuji | F16H 61/0265 |
| 2017/0253247 A1* | 9/2017 | Ishiizumi | B60W 30/18172 |

FOREIGN PATENT DOCUMENTS

| | | |
|---|---|---|
| CN | 1200996 A | 12/1998 |
| CN | 1394260 A | 1/2003 |
| CN | 1550688 A | 12/2004 |
| CN | 102933415 A | 2/2013 |
| CN | 103511523 A | 1/2014 |
| CN | 104271983 A | 1/2015 |
| CN | 105299102 A | 2/2016 |
| CN | 106062406 A | 10/2016 |
| CN | 107120370 A | 9/2017 |
| EP | 0534998 A1 | 4/1993 |

\* cited by examiner

METHOD AND APPARATUS FOR PROTECTING CLUTCH IN VEHICLE DRIVING PROCESS

TECHNICAL FIELD

The present disclosure relates to the technical field of vehicle control, and more particularly, to a method for protecting a clutch in a vehicle driving process and an apparatus for protecting the clutch in the vehicle driving process.

BACKGROUND

A clutch is located in a flywheel cover between an engine and a gearbox, a clutch assembly is generally fixed in a sealed space on a rear plane of a flywheel via a bolt, and an output shaft of the clutch is an input shaft of the gearbox. During a process when a vehicle drives, a driver may stamp or loosen a clutch pedal as required, so that the engine and the gearbox are temporarily separated and are gradually jointed to cut off or transfer a power input by the engine to the gearbox. The clutch is a frequently-used component in mechanical transmission and can separate or joint a transmission system at any time. In addition, in a torque distribution link, the clutch is in charge of distributing a torque between front shaft and rear shaft.

During the process when the vehicle drives and particularly makes a turn or drives on a snow ground or a cement or gravel road, a clutch pressure piece is frequently compressed, so that the frictional heating of the clutch is serious. If the clutch works at a high temperature state for a relatively long time, the performance of the clutch will be seriously affected.

SUMMARY

In view of this, the embodiments of the present disclosure provide a method and an apparatus for protecting a clutch in a vehicle driving process, which may effectively control a temperature of the clutch and prevent the clutch from heating excessively.

The present disclosure provides a method for protecting a clutch in a vehicle driving process, which may include the following steps.

A current oil temperature of a space where the clutch is located is acquired and whether the current oil temperature is within a set temperature interval or not is judged.

in a case where the current oil temperature is within the set temperature interval, whether a current wheel speed difference between front shaft and rear shaft reaches to a set wheel speed difference threshold or not is detected; in a case where the current wheel speed difference between the front shaft and rear shaft reaches to the set wheel speed difference threshold, a first protective mode that is preset is triggered to protect the clutch: and under the first protective mode, a maximum output torque of an engine is not greater than a current output torque.

in a case where the current oil temperature is higher than the set temperature interval, a second protective mode that is preset is triggered to protect the clutch, wherein under the second protective mode, the maximum output torque of the engine is reduced to a torque threshold determined in advance; and the torque threshold is smaller than the maximum output torque of engine under the first protective mode.

The present disclosure further provides an apparatus for protecting a clutch in a vehicle driving process, which may include a temperature detection module, a first protective module and a second protective module.

The temperature detection module is configured to acquire a current oil temperature of a space where the clutch is located and judge whether the current oil temperature is within a set temperature interval or not.

The first protective module is configured to detect, in a case where the current oil temperature is within the set temperature interval, whether a current wheel speed difference between front shaft and rear shaft reaches to a set wheel speed difference threshold or not, and trigger in a case where the current wheel speed difference between the front shaft and rear shaft reaches to the set wheel speed difference threshold, a first protective mode that is preset to protect the clutch; and under the first protective mode, a maximum output torque of an engine is not greater than a current output torque.

The second protective module is configured to trigger, in a case where the current oil temperature is higher than the set temperature interval, a second protective mode that is preset to protect the clutch, and reduce, under the second protective mode, the maximum output torque of the engine to a torque threshold determined in advance; and the torque threshold is smaller than the maximum output torque of engine under the first protective mode.

According to the above technical solutions, the current oil temperature of the space where the clutch is located is monitored; in a case where the current oil temperature is within a certain temperature range, the first protective mode that is preset is triggered to adjust the maximum output torque of the engine to protect the clutch; and in a case where the current oil temperature exceeds the temperature range, the second protective mode that is preset is triggered to reduce the maximum output torque of the engine to the torque threshold determined in advance to further protect the clutch; and therefore, the temperature of the clutch can be effectively controlled and the clutch can be prevented from heating excessively.

DETAILED DESCRIPTION OF THE EMBODIMENTS

For making the purposes, technical solutions and advantages of the present disclosure clearer, the present disclosure will further be described below in combination with the drawings and embodiments in detail. It should be understood that the specific embodiments described here are adopted not to limit the present disclosure but only to explain the present disclosure.

Figure 1:
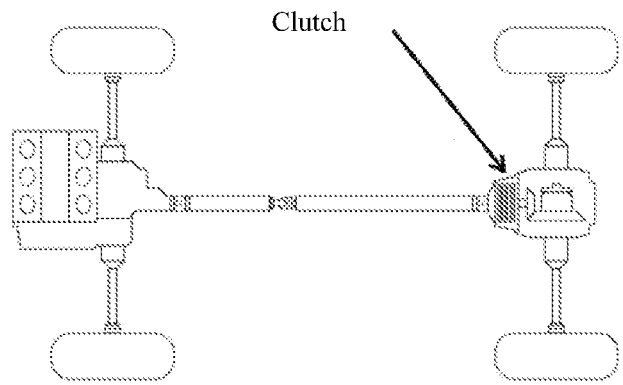
FIG. 1 is a schematic diagram of an installation environment of a vehicle clutch.

A hardware environment for implementing a method for protecting a clutch in a vehicle driving process in the present disclosure is a vehicle at least including the clutch, an engine, differential mechanisms, a temperature sensor and a clutch control system that are connected via a system bus. Herein, the clutch is located in a flywheel cover between the engine and a gearbox and its installation is as shown in FIG. 1. The engine is configured to provide a power for the vehicle, for example, a diesel engine, a gasoline engine, an electric vehicle engine and a hybrid engine. The differential mechanisms are configured to detect a wheel speed difference between front rotation shaft and rear rotation shaft of the vehicle. Preferably, the differential mechanisms may further include a front differential mechanism and a rear differential mechanism that are respectively arranged on the front rotation shaft and the rear rotation shaft. The temperature sensor is configured to detect an oil temperature of a space where the clutch is located. The clutch control system is configured to coordinate the engine and other components according to a working load condition of the clutch. Preferably, the vehicle is a four-drive vehicle, for example, a four-drive vehicle mainly based on front drives. The vehicle may be a saloon car, an off-road vehicle or a Sports Utility Vehicle (SUV) and the like, and may also be other vehicles having the above structure.

The embodiments of the method for protecting the clutch in the vehicle driving process will be described below with reference to the above hardware environment.

Figure 2:
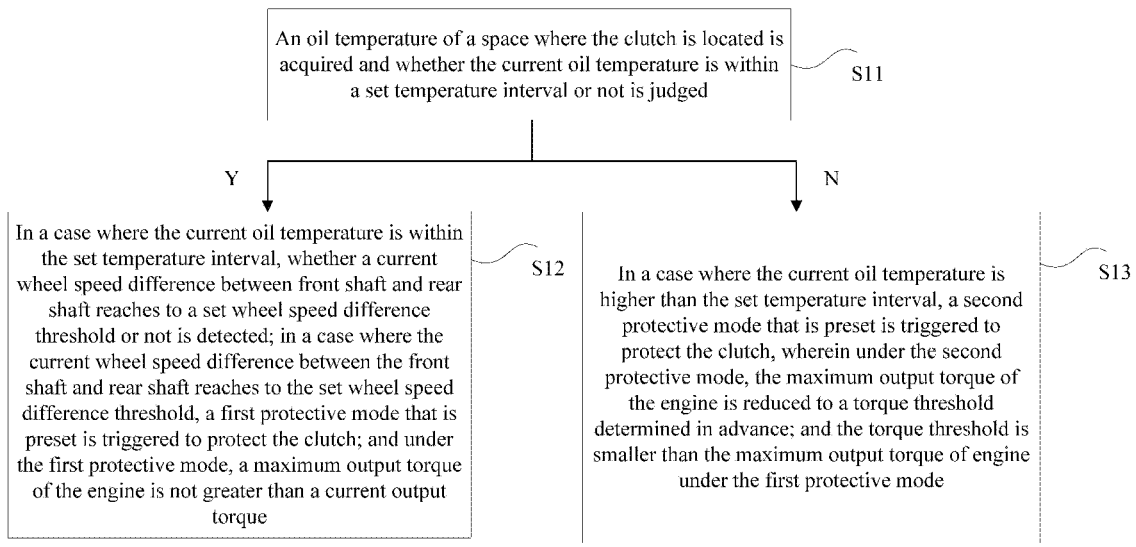
FIG. 2 is a schematic flowchart of a method for protecting a clutch in a vehicle driving process according to an embodiment.

FIG. 2 is a schematic flowchart of a method for protecting a clutch in a vehicle driving process according to an embodiment. As shown in FIG. 2, the method for protecting the clutch in the vehicle driving process in this embodiment may include the following steps.

At S11, a current oil temperature of a space where the clutch is located is acquired and whether the current oil temperature is within a set temperature interval or not is judged.

A clutch assembly is generally fixed in a sealed space on a rear plane of a flywheel. Under a condition in which the vehicle drives on a curve road, a snow ground, a muddy ground, a sandy ground, a gravel road and the like, a wheel speed difference between front shaft and rear shaft is easily occurred and this is also a case particularly for a vehicle having a four-drive system. Since the front shaft and rear shaft are rigidly connected, it is difficult to eliminate the wheel speed difference between the front shaft and rear shaft under such a condition. Because of the wheel speed difference between the front shaft and rear shaft, a clutch pressure piece is compressed. When the clutch pressure piece is frequently compressed, the clutch frictionally heats. A lubricating oil in the sealed space where the clutch is located absorbs the friction heat of the clutch and the temperature hereto will also be correspondingly increased. Therefore, in the step S11, the temperature of the clutch (as a matter of fact, it is the temperature of the clutch pressure piece) may be effectively known by detecting the oil temperature of the space where the clutch is located in real time.

Herein, the set temperature interval may be provided in terms of different, vehicle types or clutch types. Preferably, the temperature interval may be set as 60-90° C.

At S12, in a case where the current oil temperature is within the set temperature interval, whether a current wheel speed difference between front shaft and rear shaft reaches to a set wheel speed difference threshold or not is detected; in a case where the current wheel speed difference between the front shaft and rear shaft reaches to the set wheel speed difference threshold, a first protective mode that is preset is triggered to protect the clutch; and under the first protective mode, a maximum output torque of the engine is not greater than a current output torque.

Through the above step S12, when the oil temperature of the clutch does not exceed the set temperature interval, the protection of the clutch is implemented via the first protective mode. Preferably, since the oil temperature of the clutch is not very high at this moment, a protective strategy (i.e., the first protective mode) is started in combination with two trigger conditions, namely the wheel speed difference between the front shaft and rear shaft and the oil temperature. A specific implementation manner of the first protective mode for protecting the clutch is to send a torque request to the engine and adjust the maximum output torque of the engine into a relatively small torque (i.e., the torque threshold). In other words, by controlling the output torque of the engine to be within a certain range, the further increase of the wheel speed difference between the front shaft and rear shaft is avoided and thus the temperature of the clutch is prevented from being increased continuously and quickly.

At S13, in a case where the current oil temperature is higher than the set temperature interval, a second protective mode that is preset is triggered to protect the clutch, wherein under the second protective mode, the maximum output torque of the engine is reduced to a torque threshold determined in advance; and the torque threshold is smaller than the maximum output torque of engine under the first protective mode.

Through the above step S13, when the oil temperature of the clutch is higher than the set temperature interval, i.e., a condition in which the oil temperature of the clutch is at a relatively high temperature, in order to enable the temperature of the clutch to fall back, the current wheel speed difference between the front shaft and rear shaft is no longer taken as a condition for starting the protective mode at this moment, but the second protective mode is directly triggered to implement the emergency protection of the clutch. Compared with the first protective mode, the second protective mode is not restricted by the wheel speed difference between the front shaft and rear shaft, so the control effect on the temperature of the clutch is quicker. A specific implementation manner of the second protective mode is to reduce the maximum output torque of the engine to the torque threshold determined in advance, and the torque threshold is smaller than the maximum output torque of engine under the first protective mode. Optionally, the torque threshold may be zero.

According to the protection method in the above embodiment, the current oil temperature of the space where the clutch is located is monitored; in a case where the current oil temperature is within a certain temperature range, the first protective mode that is preset is triggered to adjust the maximum output torque of the engine to protect the clutch; and in a case where the current oil temperature exceeds the temperature range, the second protective mode that is preset is triggered to reduce the maximum output torque of the engine to the torque threshold determined in advance to further protect the clutch; and therefore, the temperature of the clutch can be effectively controlled and the clutch can be prevented from heating excessively.

In an optional embodiment, the method for protecting the clutch in the vehicle driving process may further include a step that the torque threshold under the second protective mode is set in advance. Correspondingly, after the second protective mode is triggered, the method may further include a step that the preset torque threshold is acquired and the maximum output torque of the engine is set as the torque threshold.

In an optional embodiment, the method for protecting the clutch in the vehicle driving process may further include a step that a torque reduction proportion under the second protective mode is preset. Correspondingly, after the second protective mode is triggered, the method may further include a step that the torque reduction proportion as well as an output torque of the engine at a current moment is acquired, and the torque threshold is determined according to the torque reduction proportion as well as the current output torque of the engine, specifically for example, torque threshold=current output torque of the engine*torque reduction proportion. The torque reduction proportion may be provided according to the different vehicle types or engine types. Optionally, the torque reduction proportion is 0.5-0.7.

In a preferred embodiment, after a condition for triggering the first protective mode in the step S12 is met and after a condition for triggering the second protective mode in the step S13 is met, the method may further include a step that a preset alarm signal is output to remind a driver (user) of starting a protective response to the clutch at present. Preferably, the alarm information output after the condition for triggering the first protective mode is triggered is different from that output after the condition for triggering the second protective mode is triggered. For example, the alarm information output after the condition for triggering the first protective mode is triggered is a corresponding indicator lamp turn-on signal on a vehicle instrument panel of the vehicle. However, the alarm information output after the condition for triggering the second protective mode is triggered are the corresponding indicator lamp turn-on signal on the vehicle instrument panel of the vehicle and a sound alarm signal, so that the prompt effect is enhanced and the driver may know that the temperature of the clutch at present is very high and a corresponding protective response may be started as soon as possible.

It may be understood that the first protective mode and the second protective mode may be switched according to an actual condition. For example, if the temperature of the clutch is increased continuously after entering the first protective, the second protective mode may be triggered; and after entering the second protective mode, the temperature of the clutch may be decreased and then it is possible to go back to the first protective mode again.

In an optional embodiment, a specific manner for triggering the first protective mode may be as follows.

In a case where the current oil temperature is within the set temperature interval and when the wheel speed difference between the front shaft and rear shaft reaches to the wheel speed difference threshold, a first request enable signal is triggered to be nonzero. When the first request enable signal is detected to be nonzero, a first torque request signal is sent to the engine, wherein the first torque request signal is used for controlling the engine to adjust the maximum output torque as the current output torque. Therefore, the increase in the working load of the clutch due to the further increase of the wheel speed difference between the front shaft and rear shaft may be prevented.

A specific manner for triggering the second protective mode may be as follows.

In a case where the current oil temperature is higher than the set temperature interval, a second request enable signal is triggered to be nonzero. When the second request enable signal is detected to be nonzero, a second torque request signal is sent to the engine, where the second torque request signal is used for controlling the engine to adjust the maximum output torque as the torque threshold determined in advance.

In an optional embodiment, after the first protective mode is triggered, in a case where it is detected that the wheel speed difference between the front shaft and rear shaft is lower than the wheel speed difference threshold, or the oil temperature is lower than the set temperature interval, the first protective mode is exited. After the second protective mode is triggered, in a case where it is detected that the oil temperature is reduced to a set first temperature threshold, the second protective mode is exited. The first temperature threshold pertains to the set temperature interval.

Further, optionally, a manner for exiting the first protective mode may be as follows: when it is detected that the wheel speed difference between the front shaft and rear shaft is lower than the wheel speed difference threshold, or the oil temperature is lower than the set temperature interval, the first request enable signal is returned to zero; when it is detected that the first request enable signal is zero, a first request cancelling signal is sent to the engine, where the first request cancelling signal is used for controlling the engine to restore the maximum output torque as a default value. Herein, the default value refers to a maximum output torque when the vehicle leaves a factory.

Optionally, a manner for exiting the second protective mode may be as follows: when the oil temperature is lower than a set first temperature threshold, the second request enable signal is returned to zero; when it is detected that the second request enable signal is zero, a second request cancelling signal is sent to the engine, where the second request cancelling signal is used for controlling the engine to restore the maximum output torque as the default value. The first temperature threshold pertains to the set temperature interval, such as 80° C.

Optionally, actions in the above embodiment may be executed by the clutch control system, or may be completed via the cooperation of the clutch control system with other vehicle control systems.

Figure 3:
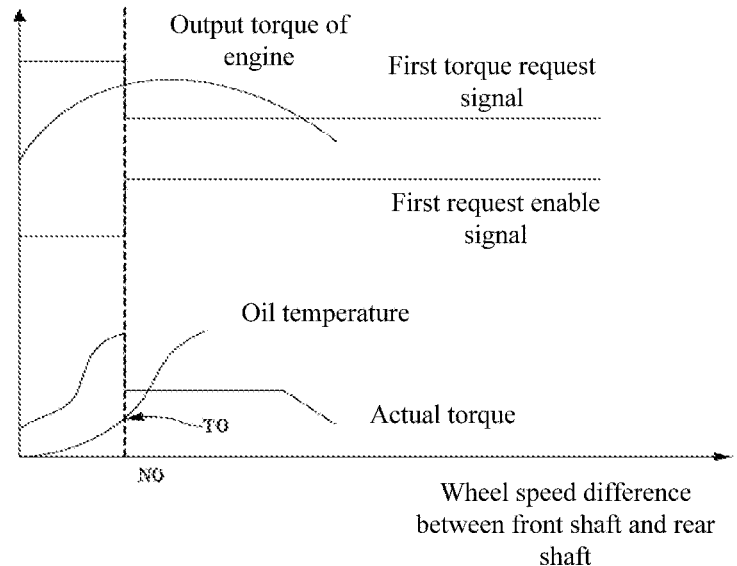
FIG. 3 is a principle diagram of a first protective mode in a method for protecting a clutch in a vehicle driving process according to an embodiment.

In a preferred embodiment, referring to FIG. 3, a specific process for limiting the reduction of the maximum output torque of the engine by triggering the first protective mode in the step S12 may be as follows: the conditions for triggering the first protective mode include the wheel speed difference between the front shaft and rear shaft and the oil temperature. When it is detected that the oil temperature reaches to a certain temperature value T0 (i.e., a minimum value in the set temperature interval) and the wheel speed difference is increased to a certain value N0 (i.e., the wheel speed difference threshold), the request enable signal 1 is triggered to be a nonzero value; when detecting that the request enable signal 1 is nonzero, the clutch control system sends the first torque request signal to the engine; and upon the reception of the first torque request signal, the engine outputs a torque not greater than N0 till the request enable signal 1 is returned to zero. Herein, when the wheel speed difference between the front shaft and rear shaft is lower than N0, or the oil temperature is lower than T0, the request enable signal 1 is automatically returned to zero. Preferably, when detecting that the request enable signal 1 is nonzero and after sending the first torque request signal to the engine, the clutch control system further may control a corresponding indicator lamp on the instrument panel of the vehicle to turn on so as to remind the driver; and after the request enable signal 1 is returned to zero, the clutch control system controls the corresponding indicator lamp on the instrument panel of the vehicle to turn off.

Figure 4:
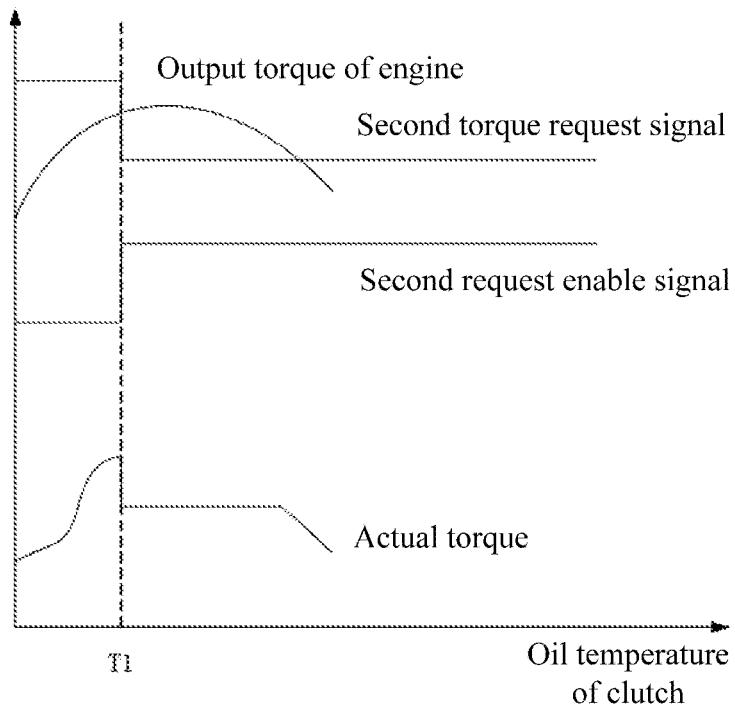
FIG. 4 is a principle diagram of a second protective mode in a method for protecting a clutch in a vehicle driving process according to an embodiment.

In a preferred embodiment, referring to FIG. 4, a specific process for limiting the reduction of the maximum output torque of the engine by triggering the second protective mode in the step S13 may be as follows: when the temperature of the clutch is increased to T1 (greater than a maximum value of the set temperature interval), the request enable signal 2 is triggered to be a nonzero value; when detecting that the request enable signal 2 is nonzero, the clutch control system sends the second torque request signal to the engine; and upon the reception of the second torque request signal, the engine adjusts the maximum output torque as a product result of the current output torque and the set torque reduction proportion a (for example, the α is 0.5-0.8) till the request enable signal 2 is returned to zero. Herein, when the oil temperature is reduced to T3 (the T3 belongs to the set temperature interval), the request enable signal 2 is automatically returned to zero. Preferably, when detecting that the request enable signal 2 is nonzero and after sending the second torque request signal to the engine, the clutch control system further may control the corresponding indicator lamp on the instrument panel of the vehicle to turn on and output a preset alarm prompt tone so as to enhance the warning on the driver; and when the request enable signal 2 is returned to zero, clutch control system controls the corresponding indicator lamp on the instrument panel of the vehicle to turn off and stops the alarm prompt tone.

It may be understood that, the request enable signal 1 and the request enable signal 2 include but not limited to be indicated through an enable signal of 0/1.

According to the method for protecting the clutch in the vehicle driving process in the above embodiment, the oil temperature of the space where the clutch is located is monitored; in a case where the current oil temperature reaches to the set temperature range, whether the current wheel speed difference between the front shaft and rear shaft reaches to the set wheel speed difference threshold or not is further detected; in a case where the current wheel speed difference between the front shaft and rear shaft reaches to the set wheel speed difference threshold, the first protective mode that is preset is triggered so that the output torque of the engine is reduced to protect the clutch; and in a case where the current oil temperature is greater than the set temperature range, the second protective mode that is preset is triggered immediately, so that the output torque of the engine is reduced to protect the clutch. Therefore, the temperature of the clutch can be effectively controlled and the clutch can be prevented from heating excessively.

It is to be noted that, the method embodiments are expressed as combinations of a series of actions for the purpose of simple description, but those skilled in the art should learn that the embodiments of the present disclosure are not limited by the described action sequence, because some steps may adopt other sequence or be simultaneously performed according to the present disclosure.

Based on a concept same as the method for protecting the clutch in the vehicle driving process in the above embodiment, the present disclosure further provides an apparatus for protecting the clutch in the vehicle driving process. The apparatus may be configured to execute the method for protecting the clutch in the vehicle driving process. In order to describe conveniently, in the structural schematic diagram of the embodiment of the apparatus for protecting the clutch in the vehicle driving process, only portions relevant to this embodiment of the present disclosure are shown. It may be understood by those skilled in the art that the shown structures are not formed into a limit to the apparatus and may include more or fewer components shown in the figure, or are combined with some components, or have different component arrangements.

Figure 5:
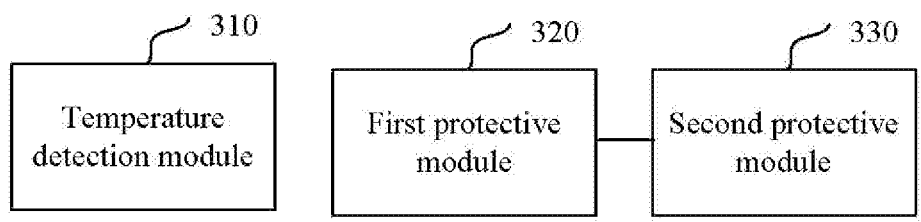
FIG. 5 is a structural schematic diagram of an apparatus for protecting a clutch in a vehicle driving process according to an embodiment.

FIG. 5 is a structural schematic diagram of an apparatus for protecting a clutch in a vehicle driving process according to an embodiment. As shown in FIG. 5, an apparatus for protecting a clutch in a vehicle driving process in this embodiment may include a temperature detection module 310, a first protective module 320 and a second protective module 330. Each of the above modules will be described below in detail.

The temperature detection module 310 is configured to acquire a current oil temperature of a space where the clutch is located and judge whether the current oil temperature is within a set temperature interval or not.

The first protective module 320 is configured to detect, in a case where the current oil temperature is within the set temperature interval, whether a current wheel speed difference between front shaft and rear shaft reaches to a set wheel speed difference threshold or not, and trigger, in a case where the current wheel speed difference between the front shaft and rear shaft reaches to the set wheel speed difference threshold, a first protective mode that is preset to protect the clutch; and under the first protective mode, a maximum output torque of an engine is not greater than a current output torque.

The second protective module 330 is configured to trigger, in a case where the current oil temperature is higher than the set temperature interval, a second protective mode that is preset to protect the clutch, and reduce, under the second protective mode, the maximum output torque of the engine to a torque threshold determined in advance; and the torque threshold is smaller than the maximum output torque of engine under the first protective mode.

In an optional embodiment, the apparatus for protecting the clutch in the vehicle driving process may further include: a setting module 340, configured to set the torque threshold under the second protective mode in advance, or preset a torque reduction proportion under the second protective mode. The second protective module 330 may further include: a torque threshold determination unit, configured to acquire, after the second protective mode is triggered, the preset torque threshold, or determine the torque threshold according to the torque reduction proportion as well as the current output, torque of the engine.

In an optional embodiment, the first protective module 320 is further configured to exit, after triggering the first protective mode, in a case where it is detected that the wheel speed difference between the front shaft and rear shaft is lower than the wheel speed difference threshold, or the oil temperature is lower than the set temperature interval, the first protective mode. The second protective module 330 is further configured to exit, after triggering the second protective mode, in a case where it is detected that the oil temperature is reduced to a set first temperature threshold, the second protective mode; and the first temperature threshold pertains to the set temperature interval.

In an optional embodiment, the first protective module 320 may specifically include a first enable signal trigger unit and a first request sending unit.

The first enable signal trigger unit is configured to trigger, when the wheel speed difference between the front shaft, and rear shaft reaches to the wheel speed difference threshold and when the oil temperature is within the set temperature interval, a first request enable signal to be nonzero.

The first request sending unit is configured to send, when detecting that the first request enable signal is nonzero, a first torque request signal to the engine; and the first torque request signal is used for controlling the engine to adjust the maximum output torque as the current output torque.

The second protective module 330 may include a second enable signal trigger unit and a second request sending unit.

The second enable signal trigger unit is configured to trigger, in a case where the current oil temperature is higher than the set temperature interval, a second request enable signal to be nonzero.

The second request sending unit is configured to send, when detecting that the second request enable signal is nonzero, a second torque request signal to the engine; and the second torque request signal is used for controlling the engine to adjust the maximum output torque as the torque threshold determined in advance.

Further, the first protective module 320 may further include a first enable signal zero returning unit and a first request cancelling unit.

The first enable signal zero returning unit is configured to return, when detecting that the wheel speed difference between the front shaft and rear shaft is lower than the wheel speed difference threshold, or the oil temperature is lower than the set temperature interval, the first request enable signal to zero.

The first request cancelling unit is configured to send, when detecting that the first request enable signal is zero, a first request cancelling signal to the engine; and the first request cancelling signal is used for controlling the engine to restore the maximum output torque as a default value.

The second protective module 330 may further include a second enable signal zero returning unit and a second request cancelling unit.

The second enable signal zero returning unit is configured to return, when the oil temperature is lower than a set first temperature threshold, the second request enable signal to zero; and the first temperature threshold pertains to the set temperature interval.

The second request cancelling unit is configured to send, when detecting that the second request enable signal is zero, a second request cancelling signal to the engine; and the second request cancelling signal is used for controlling the engine to restore the maximum output torque as the default value.

Through the apparatus for protecting the clutch in the vehicle driving process in the above embodiment, in a case where the current oil temperature is within a certain temperature interval, whether the current wheel, speed difference between the front shaft and rear shaft reaches to the set wheel speed difference threshold or not is detected: when the wheel speed difference between the front shaft and rear shaft reaches to the set wheel speed difference threshold, the first protective mode that is preset is triggered to limit the maximum output torque of the engine to protect the clutch, wherein the current oil temperature is greater than or equal to a certain value, the second protective mode that is preset is triggered immediately so that the maximum output torque of the engine is reduced to protect the clutch. Therefore, the temperature of the clutch can be effectively controlled and the clutch can be prevented from heating excessively.

It is to be noted that, in the implementation manner of the apparatus for protecting the clutch in the vehicle driving process in the above embodiment, since contents such as information interaction and an execution process between modules/units are based on the same concept as the above method embodiment of the present disclosure, the technical effect thereto is the same as the above method embodiment of the present disclosure, and the specific contents may be referred to the description in the above method embodiment of the present disclosure and will not be repeated here.

In addition, in the implementation manner of the apparatus for protecting the clutch in the vehicle driving process in the above embodiment, the logical division of each functional module is merely for description and may be considered as required in an actual application, for example, with a view to a configuration requirement or software implementation of corresponding hardware. The above functional distribution is completed by different functional modules, that is, an internal structure of the apparatus for protecting the clutch in the vehicle driving process is divided into different functional modules to complete the above-described all or a part of functions. Herein, each functional module may be implemented in a hardware form and may also be implemented in a software functional module.

Those skilled in the art may understand that, all or a part of procedures in the method for implementing the above embodiment may be completed by enabling a computer program to direct relevant hardware. The program may be stored in a computer readable storage medium to be sold or used as an independent product. When the program is run, all or a part of steps in the embodiment of the method may be performed. The storage medium may be a magnetic disk, an optical disk, a read-only memory (ROM), or a random access memory (RAM), etc.

In the above embodiments, the description on each embodiment has its preference. The portion not detailed in some embodiment may be referred to relevant description in other embodiments. It may be understood that, the terms "first", "second" and the like used herein are used for distinguishing objects. However, these objects are not limited by these terms.

The foregoing description only describes several implementation manners of the present disclosure, but is not intended to limit the protection scope of the present disclosure. It is to be noted that, any variation or replacement made by those of ordinary skill in the art without departing from the concept of the present disclosure shall fall within the protection scope of the present disclosure. Therefore, the protection scope of the present disclosure shall be subject to the claims.

What is claimed is:

1. A method for protecting a clutch in a vehicle driving process, comprising:
   acquiring a current oil temperature of a space where the clutch is located and judging whether the current oil temperature is within a set temperature interval or not;
   in a case where the current oil temperature is within the set temperature interval, detecting whether a current wheel speed difference between front shaft and rear shaft reaches to a set wheel speed difference threshold or not; and in a case where the current wheel speed difference between the front shaft and rear shaft reaches to the set wheel speed difference threshold, triggering a first protective mode that is preset to protect the clutch, wherein under the first protective mode, a maximum output torque of an engine is not greater than a current output torque; and
   in a case where the current oil temperature is higher than the set temperature interval, triggering a second protective mode that is preset to protect the clutch, wherein under the second protective mode, the maximum output torque of the engine is reduced to a torque threshold determined in advance, and the torque threshold is smaller than the maximum output torque of engine under the first protective mode;

in a case where the current wheel speed difference between the front shaft and rear shaft reaches to the set wheel speed difference threshold, triggering a first protective mode that is preset comprises:
when the wheel speed difference between the front shaft and rear shaft reaches to the wheel speed difference threshold, triggering a first request enable signal to be nonzero; and when detecting that the first request enable signal is nonzero, sending a first torque request signal to the engine, wherein first torque request signal is used for controlling the engine to adjust the maximum output torque as the current output torque; and
in a case where the current oil temperature is higher than the set temperature interval, triggering the second protective mode comprises:
in a case where the current oil temperature is higher than the set temperature interval, triggering a second request enable signal to be nonzero; and when detecting that the second request enable signal is nonzero, sending a second torque request signal to the engine, wherein the second torque request signal is used for controlling the engine to adjust the maximum output torque as the torque threshold determined in advance.

2. The method for protecting the clutch in the vehicle driving process as claimed in claim 1, further comprising:
setting the torque threshold under the second protective mode in advance;
or, presetting a torque reduction proportion under the second protective mode; and
after the second protective mode is triggered, further comprising:
acquiring the preset torque threshold;
or, determining the torque threshold according to the torque reduction proportion as well as a current output torque of the engine.

3. The method for protecting the clutch in the vehicle driving process as claimed in claim 2, further comprising:
after triggering the first protective mode, in a case where it is detected that the wheel speed difference between the front shaft and rear shaft is lower than the wheel speed difference threshold, or the oil temperature is lower than the set temperature interval, exiting the first protective mode; and
after triggering the second protective mode, in a case where it is detected that the oil temperature is reduced to a set first temperature threshold, exiting the second protective mode, wherein the first temperature threshold pertains to the set temperature interval.

4. The method for protecting the clutch in the vehicle driving process as claimed in claim 1, wherein
exiting the first protective mode comprises: when detecting that the wheel speed difference between the front shaft and rear shaft is lower than the wheel speed difference threshold, or the oil temperature is lower than the set temperature interval, returning the first request enable signal to zero; and when detecting that the first request enable signal is zero, sending a first request cancelling signal to the engine, wherein the first request cancelling signal is used for controlling the engine to restore the maximum output torque as a default value; and
exiting the second protective mode comprises: when the oil temperature is lower than a set first temperature threshold, returning the second request enable signal to zero; and when detecting that the second request enable signal is zero, sending a second request cancelling signal to the engine, wherein the second request cancelling signal is used for controlling the engine to restore the maximum output torque as the default value, and the first temperature threshold pertains to the set temperature interval.

5. An apparatus for protecting a clutch in a vehicle driving process, comprising:
a temperature detection module, configured to acquire a current oil temperature of a space where the clutch is located and judge whether the current oil temperature is within a set temperature interval or not;
a first protective module, configured to detect, in a case where the current oil temperature is within the set temperature interval, whether a current wheel speed difference between front shaft and rear shaft reaches to a set wheel speed difference threshold or not, and trigger, in a case where the current wheel speed difference between the front shaft and rear shaft reaches to the set wheel speed difference threshold, a first protective mode that is preset to protect the clutch, wherein under the first protective mode, a maximum output torque of an engine is not greater than a current output torque; and
a second protective module, configured to trigger, in a case where the current oil temperature is higher than the set temperature interval, a second protective mode that is preset to protect the clutch, and reduce, under the second protective mode, the maximum output torque of the engine to a torque threshold determined in advance, wherein the torque threshold is smaller than the maximum output torque of engine under the first protective mode;
wherein the first protective module comprises:
a first enable signal trigger unit, configured to trigger, when the wheel speed difference between the front shaft and rear shaft reaches to the wheel speed difference threshold and when the oil temperature is within the set temperature interval, a first request enable signal to be nonzero; and
a first request sending unit, configured to send, when detecting that the first request enable signal is nonzero, a first torque request signal to the engine, wherein and the first torque request signal is used for controlling the engine to adjust the maximum output torque as the current output torque; and
wherein the second protective module comprises:
a second enable signal trigger unit, configured to trigger, in a case where the current oil temperature is higher than the set temperature interval, a second request enable signal to be nonzero; and
a second request sending unit, configured to send, when detecting that the second request enable signal is nonzero, a second torque request signal to the engine, wherein the second torque request signal is used for controlling the engine to adjust the maximum output torque as the torque threshold determined in advance.

6. The apparatus for protecting the clutch in the vehicle driving process as claimed in claim 5, further comprising a setting module, configured to set the torque threshold under the second protective mode in advance, or preset a torque reduction proportion under the second protective mode; and
the second protective module may further comprises:
a torque threshold determination unit, configured to acquire, after the second protective mode is triggered, the preset torque threshold, or determine the torque threshold according to the torque reduction proportion as well as the current output torque of the engine.

7. The apparatus for protecting the clutch in the vehicle driving process as claimed in claim 6, wherein
the first protective module is further configured to exit, after triggering the first protective mode, in a case where it is detected that the wheel speed difference between the front shaft and rear shaft is lower than the wheel speed difference threshold, or the oil temperature is lower than the set temperature interval, the first protective mode; and
the second protective module is further configured to exit, after triggering the second protective mode, in a case where it is detected that the oil temperature is reduced to a set first temperature threshold, the second protective mode, wherein the first temperature threshold pertains to the set temperature interval.

8. The apparatus for protecting the clutch in the vehicle driving process as claimed in claim 5, wherein
the first protective module further comprises:
a first enable signal zero returning unit, configured to return, when detecting that the wheel speed difference between the front shaft and rear shaft is lower than the wheel speed difference threshold, or the oil temperature is lower than the set temperature interval, the first request enable signal to zero; and
a first request cancelling unit, configured to send, when detecting that the first request enable signal is zero, a first request cancelling signal to the engine, wherein the first request cancelling signal is used for controlling the engine to restore the maximum output torque as a default value; and
the second protective module comprises:
a second enable signal zero returning unit, configured to return, when the oil temperature is lower than a set first temperature threshold, the second request enable signal to zero, wherein the first temperature threshold pertains to the set temperature interval; and
a second request cancelling unit, configured to send, when detecting that the second request enable signal is zero, a second request cancelling signal to the engine, wherein the second request cancelling signal is used for controlling the engine to restore the maximum output torque as the default value.

\* \* \* \* \*